US009991936B2

(12) United States Patent
Toivonen et al.

(10) Patent No.: US 9,991,936 B2
(45) Date of Patent: Jun. 5, 2018

(54) DOOR LOCK AND ARRANGEMENT FOR TRANSFERRING POWER TO DOOR LOCK

(71) Applicant: ROLLOCK OY, Espoo (FI)

(72) Inventors: Timo Toivonen, Helsinki (FI); Hannu Kankkunen, Espoo (FI)

(73) Assignee: ROLLOCK OY, Espoo (FI)

( * ) Notice: Subject to any disclaimer, the term of this patent is extended or adjusted under 35 U.S.C. 154(b) by 0 days. days.

(21) Appl. No.: 15/538,866

(22) PCT Filed: Dec. 22, 2015

(86) PCT No.: PCT/FI2015/050934
§ 371 (c)(1),
(2) Date: Jun. 22, 2017

(87) PCT Pub. No.: WO2016/102778
PCT Pub. Date: Jun. 30, 2016

(65) Prior Publication Data
US 2017/0373723 A1  Dec. 28, 2017

(30) Foreign Application Priority Data
Dec. 23, 2014 (FI) ..................................... 20146143

(51) Int. Cl.
*H04B 5/00* (2006.01)
*E05B 47/00* (2006.01)
(Continued)

(52) U.S. Cl.
CPC ......... *H04B 5/0037* (2013.01); *H04B 5/0081* (2013.01); *E05B 2047/0061* (2013.01);
(Continued)

(58) Field of Classification Search
CPC . H04B 5/0037; H04B 5/0081; G07C 9/00309
(Continued)

(56) References Cited

U.S. PATENT DOCUMENTS

| 5,517,184 A * | 5/1996 | Miller ..................... E05B 37/00 340/5.28 |
| 2007/0146115 A1* | 6/2007 | Roosli ..................... E05B 47/00 340/5.6 |

(Continued)

FOREIGN PATENT DOCUMENTS

| WO | 2 660 785 A2 | 11/2013 |
| WO | WO 2014/199009 A1 | 12/2014 |

OTHER PUBLICATIONS

International Search Report (PCT/ISA/210) issued in PCT/FI2015/050934, dated Apr. 21, 2016.
(Continued)

*Primary Examiner* — Allen T Cao
(74) *Attorney, Agent, or Firm* — Birch, Stewart, Kolasch & Birch, LLP

(57) ABSTRACT

Lock arrangement and method for transferring electrical power with a lock arrangement that includes a counterpart of the lock and an electrical lock including a lock case. A device for wirelessly sending electrical power to the lock case and/or into connection with the lock case is arranged in connection with the counterpart of the lock, and arranged in the lock case and/or in connection with the lock case are a device for wirelessly receiving electrical power from the device for sending electrical power that is arranged in connection with the counterpart of the lock. The counterpart of the lock wirelessly sends electrical power to the lock case and/or into connection with the lock case with the device that is for sending electrical power, and the lock case wirelessly receives electrical power from the counterpart of the lock with the device that is for receiving electrical power, when the lock and the counterpart of the lock are at a certain distance from each other. The electrical power received from the connection of the lock is measured and the power level of the electrical power sent is increased and/or decreased in (Continued)

such a way that the measured level of the electrical power received is between certain predetermined upper and lower values or essentially at a given preset level.

16 Claims, 5 Drawing Sheets

(51) Int. Cl.
    *H02J 50/10*     (2016.01)
    *G07C 9/00*     (2006.01)

(52) U.S. Cl.
    CPC ............... *G07C 9/00309* (2013.01); *G07C 2009/00357* (2013.01); *H02J 50/10* (2016.02)

(58) Field of Classification Search
    USPC .................................. 340/5.7–5.74
    See application file for complete search history.

(56) References Cited

U.S. PATENT DOCUMENTS

| | | | |
|---|---|---|---|
| 2014/0197692 A1* | 7/2014 | Chen ................ | G07C 9/00174 307/104 |
| 2014/0265359 A1* | 9/2014 | Cheng ............... | E05B 47/026 292/144 |
| 2014/0340032 A1* | 11/2014 | Curtis ............... | H04B 5/0037 320/108 |

OTHER PUBLICATIONS

Written Opinion (PCT/ISA/1237) issued in PCT/FI2015/050934, dated Apr. 21, 2016.

\* cited by examiner

DOOR LOCK AND ARRANGEMENT FOR TRANSFERRING POWER TO DOOR LOCK

FIELD OF THE INVENTION

The invention relates to a door lock and an arrangement for transferring power to the door lock.

BACKGROUND OF THE INVENTION

Known in the art are door locks comprising a lock case and a locking latch, which door locks can be opened and closed mechanically. Also known in the art are electrical locks, which can be controlled to open and close by means of electrical commands and electrical opening means. In the arrangements known in the art, the electrical connections of a lock that is in a door are arranged e.g. by means of wires or other corresponding conductors through the frame of the door. The conductors could be led to the door lock e.g. via the door frame from the hinge side of the door.

Leading the conductors requires a passageway in the door for the conductors and, that being the case, a conventional door cannot be used with an electric lock without adapting the door. In their present state, pre-ordered special doors must be used for doors that are provided with an electric lock, said doors having passageways for electrical conductors, or otherwise a conventional door must be adapted by making in it passageways going through the door for the conductors. Both methods are expensive relative to the costs of conventional doors. In addition to this, according to regulations holes may not be made in some doors, such as e.g. in fire doors.

Also known in the art are electrical door locks to which electrical power can be transferred wirelessly. By means of these locks that enable wireless power transfer, wiring coming through the structure of the door to the lock that is in the door can be avoided. These electrical locks can be used in conventional doors in which space for wires has not been arranged. In solutions known in the art power can be transferred e.g. from the striking plate to the lock case when the door is closed and the lock and striking plate are face to face. A problem in solutions known in the art for the wireless transfer of power is that when the door is closed, the distance and/or the alignment between the lock and the striking plate can vary from door to door. Since a lock arrangement must function reliably in different doors and door frames, the power supply must be dimensioned in such a way that enough power is supplied in all cases, also when the relative distance of the lock and the striking plate from each other is great and when the lock and the striking plate are not fully face to face. This increases energy consumption and might also cause the premature wearing of components.

BRIEF DESCRIPTION OF THE INVENTION

The aim of the current invention is to achieve a new type of lock and an arrangement for transferring power to an electrical lock that can be installed in a door.

The lock arrangement according to the invention comprises a counterpart of the lock and an electrical lock comprising a lock case. Means for wirelessly sending electrical power to the lock case and/or into connection with the lock case are arranged in connection with the counterpart of the lock. Arranged in the lock case and/or in connection with the lock case are means for wirelessly receiving electrical power from the means for sending electrical power that are arranged in connection with the counterpart of the lock. In the solution according to the invention the counterpart of the lock wirelessly sends electrical power to the lock case and/or into connection with the lock case with the means that are for sending electrical power, and the lock case wirelessly receives electrical power from the counterpart of the lock with the means for receiving electrical power when the lock and the counterpart of the lock are at a certain distance from each other. In the solution of the invention the electrical power received from the connection of the lock is further measured, e.g. from the means for receiving electrical power, and the power level of the electrical power sent is decreased and/or increased in such a way that the measured level of the electrical power received is between certain determined upper and lower values or essentially at a given preset level.

The solution according to the invention now presented has some significant advantages when it is compared to prior-art solutions. By means of the solution according to the invention, the current consumption of the lock arrangement can be optimized in such a way that the lock arrangement functions reliably in different doors and door frames even though the relative distance of lock and the counterpart of the lock and/or their alignment with respect to each other were to vary. In this way unnecessary power consumption is avoided because power is sent only to the extent that the power level received can be kept at a predefined level. This reduces energy consumption and premature wearing of components with respect to solutions known in the art.

In one embodiment of the invention, the wireless transfer of power is implemented as inductive power transmission.

In one embodiment of the invention the lock sends to the counterpart of the lock information about the level of measured electrical power.

In one embodiment of the invention the information about the level of measured electrical power is a measured value of the electrical power level, such as e.g. power level, voltage or current, or information about whether the measured level of electrical power is too low, too high, at essentially a predetermined level and/or between predetermined limit values.

BRIEF DESCRIPTION OF THE FIGURES

In the following, the invention will be described in more detail by the aid some examples of its embodiment with reference to the drawings 1-5, wherein.

DETAILED DESCRIPTION OF THE INVENTION

Figure 1:
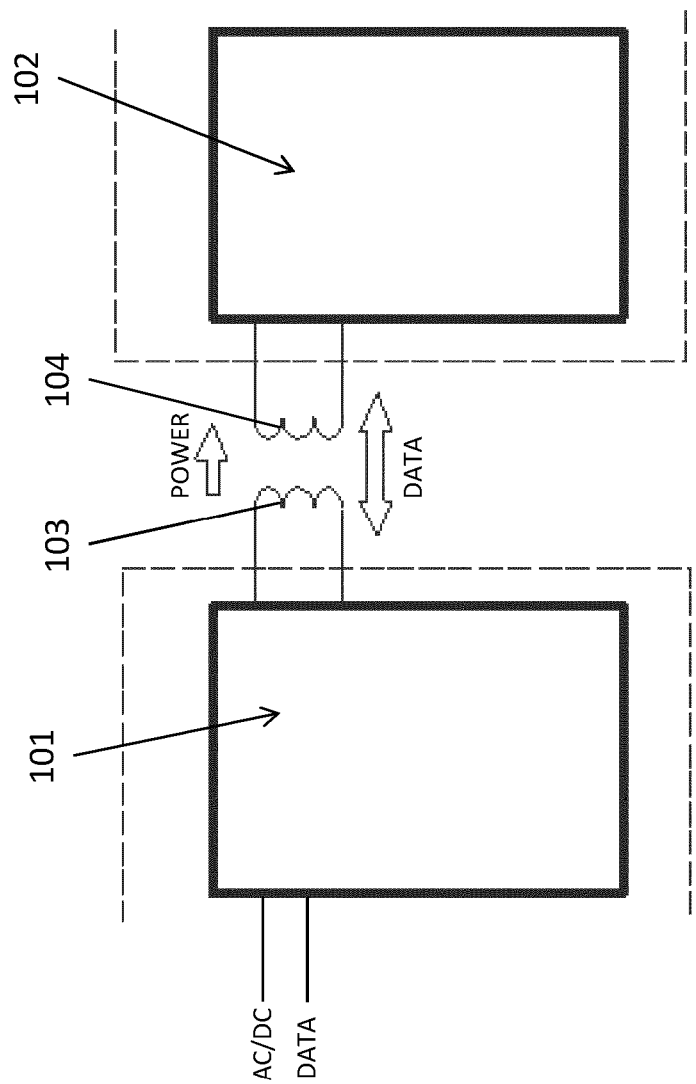
FIG. 1 presents a schematic view of the operating principle of one embodiment of the invention.

FIG. 1 presents a schematic view of the solution of one embodiment of the invention. In the solution according to the invention the counterpart 101 of the lock, said counterpart being fitted into the frame of the door, scans for the presence of the lock 102 of the door at regular intervals. The lock 102 and the counterpart 101 of the lock comprise coils 103, 104, which are used for the wireless transfer of electrical power. When the lock 102 is at a suitable distance from the counterpart 101 of the lock, e.g. when the door is closed, the counterpart 101 of the lock controls current to the transmitter coil 103, which produces a magnetic field. The magnetic field connects to the receiver, i.e. to the coil 104 of the lock, and forms alternating current there, which is rectified and filtered. The power transfer is thus based on magnetic induction, correspondingly to that in a mains transformer (primary coil and secondary coil). In the solution according to the invention e.g. two planar coils are used, instead of an iron core transformer. In practice the medium of the coils is air, in some embodiments of the invention partly also plastic.

When the arrangement is functioning, the unit sending power, i.e. the counterpart 101 of the lock, scans for the presence of the lock 102 at regular intervals (so-called ping function). If the lock 102 does not respond to the scan and/or if the object is not identified, the power transfer is not switched into use. In this way the warming of the wrong metal objects and also the unnecessary power consumption of the device are prevented.

In a lock application the length of an identification interval affects the delay in connection of power transfer, and therefore in the operation of the lock, after the door has closed.

In one embodiment of the invention, instead of inductive power transfer, the principle of magnetic resonance or some other method can be used for wirelessly transferring electrical power from the counterpart of the lock to the lock.

Figure 2:
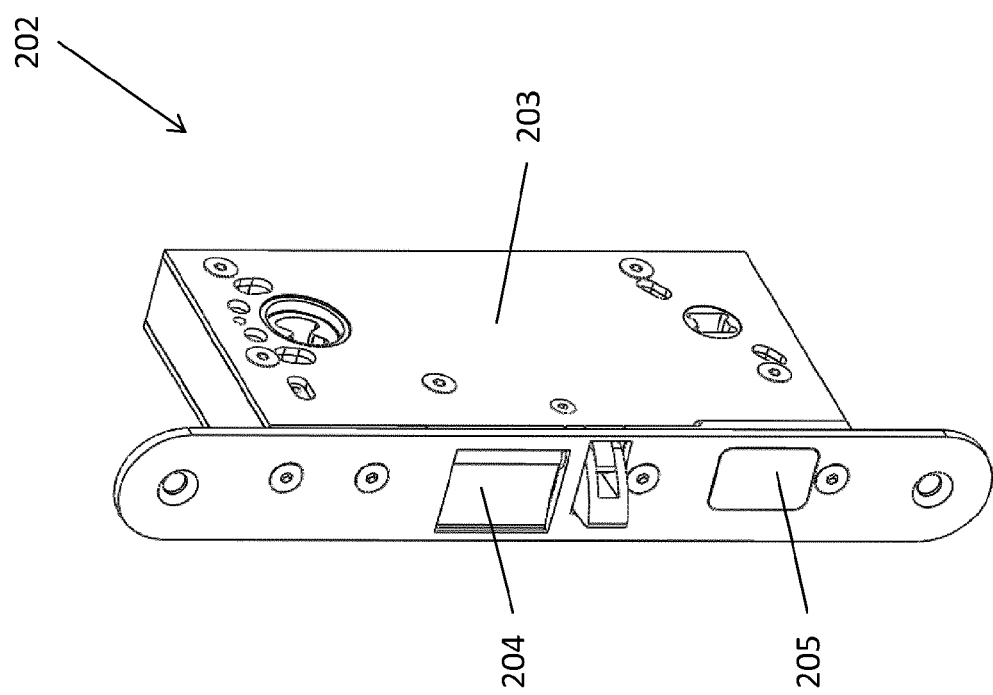
FIG. 2 presents the structure of a lock according to one embodiment of the invention.

FIG. 2 presents by way of example the structure of a lock according to one embodiment of the invention. The lock comprises a lock case 203, which lock case comprises a locking latch 204 and a latch mechanism. The latch mechanism comprises electrical means for opening and/or closing the locking latch. Means are arranged in connection with the lock case 203 for wirelessly receiving 205 electrical power from the means for sending electrical power that are arranged in connection with the counterpart of the lock.

In one embodiment of the invention, the lock functions mechanically and the mechanical lock can also be opened and/or closed electrically.

Figure 3:
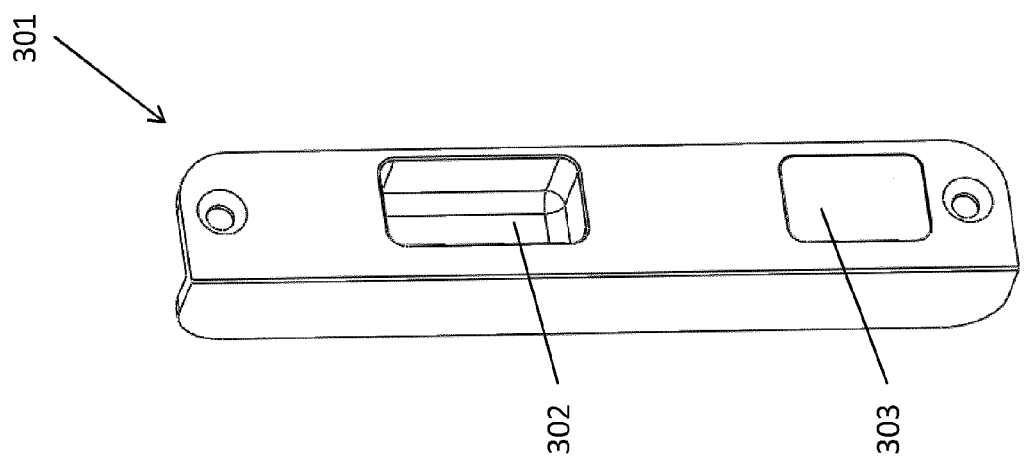
FIG. 3 presents the structure of a counterpart of the lock according to one embodiment of the invention.

FIG. 3 presents a counterpart 301, according to an embodiment of the invention, of the lock, said counterpart comprising an aperture for the locking latch 302 of the lock and means for sending 303 electrical power. The counterpart of the lock can be fixed into the door frame at a point corresponding to the lock of the door, and wiring to the counterpart of the lock is arranged via the door frame.

In the solution according to the invention, the means for receiving 205 and for sending 303 electrical power can be coils. A lock environment is characteristically narrow and high in structure. The electronics used in the arrangement according to the invention can be disposed inside the lock to some extent more freely than the coils that transfer power— the coils, on the other hand, must be brought close to each other on the front surfaces of the lock and of the counterpart. The coils can be implemented to be planar in structure (planar coils).

Figure 4:
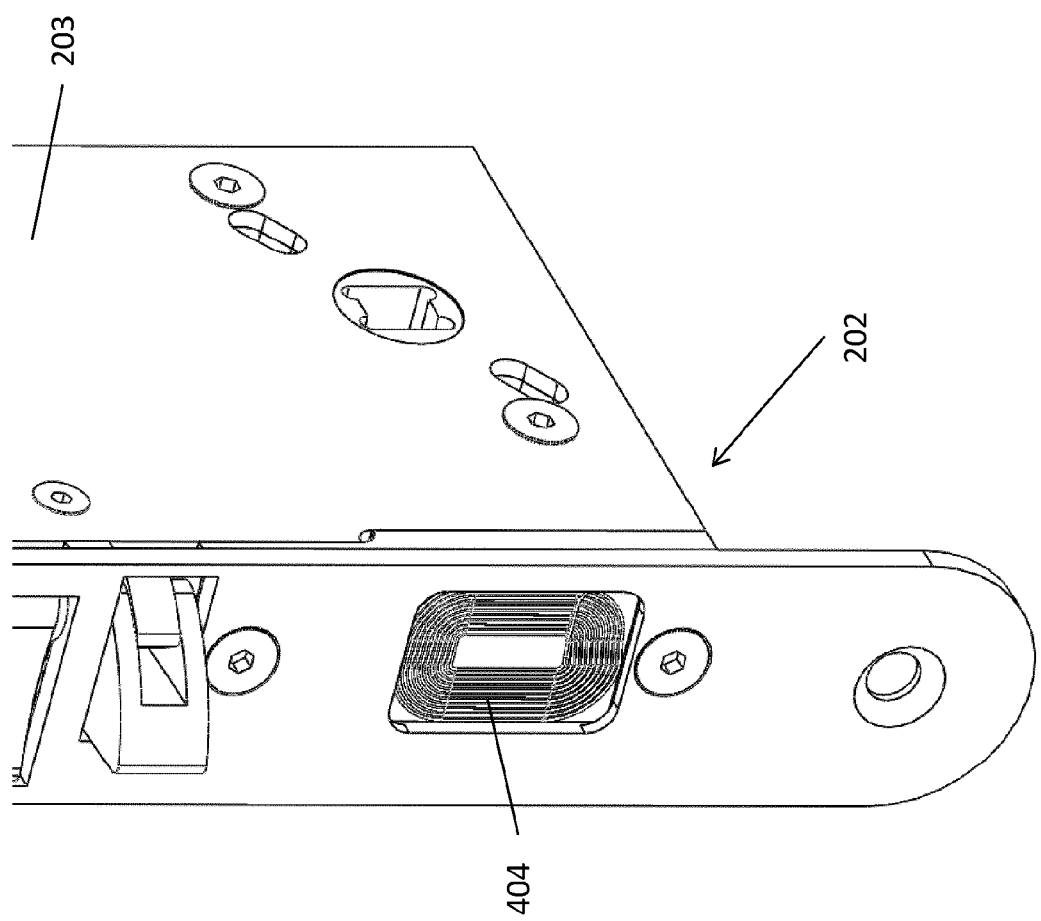
FIG. 4 presents the structure of a lock according to one embodiment of the invention, wherein a coil used for receiving electrical power is presented.

FIG. 4 presents a magnification of the bottom part of the lock. The lock of FIG. 4 corresponds in its structure to the lock presented in FIG. 2, but in it a coil 404 used for receiving electrical power is presented.

The width of the magnetic field between the coils is small in the lateral direction. Thus the metal in the environs of the transmitter coil and receiver coil hardly affects the functionality of the power transfer and the resonance circuits at all.

For shielding behind the coils the other electronics from interference and also for directing the magnetic field, a relatively thin, e.g. 1-2 mm thick, ferrite sheet can generally be used. Ferrite material is used as a suitable material for shielding from interference. The ferrite sheet that is background material behind the transmitter coil and receiver coil guides the direction of the magnetic field and prevents the field spreading behind a coil, and thus, for its part, shields the other electronics from interference.

In the solution according to the invention the lock and the counterpart of the lock, as well as the means comprised in them for sending and receiving electrical power, are arranged in the door and in the door frame in such a way that the door can be opened and closed but the transfer of power only succeeds when the door is closed. It is not good for the transfer of electrical power and/or the transfer of information to operate when the door is open because in this case the door would appear to the arrangement, and e.g. to access control systems, to be closed even though it was really open.

In one embodiment of the invention, in the lock arrangement the transfer of electrical power is possible at an operating range of approx. 10 mm. The maximum distance between the frame and the lock when the door is closed is typically approx. 6 mm. Both the transmitter coil and the receiver coil can be shielded with an approx. 2 mm layer, in which case an operating range of approx. 10 mm is sufficient in a lock application.

In the arrangement according to the invention information can also be wirelessly sent between the lock and the counterpart of the lock. The transfer of information can be implemented with the means used for the transfer of electrical power.

In the solution of the invention there can also be a function for detecting metal objects, with which function possible warming, owing to induction, of a metal object brought into the proximity of the frame can be prevented. The function can be implemented by using communication between the devices at regular intervals occurring in connection with detection of the presence of the lock. The detection can be used directly also for detecting closing of the door and thus for connecting supply power when the door is closed.

In one embodiment of the invention a device that does not have the right to use the lock, or a situation in which an attempt is made to interfere with the lock, e.g. with magnets, can be detected. These fraud or interference attempts can be detected e.g. in such a way that a magnet or other device that does not have a right to control the lock is not able to communicate with the lock.

Figure 5:
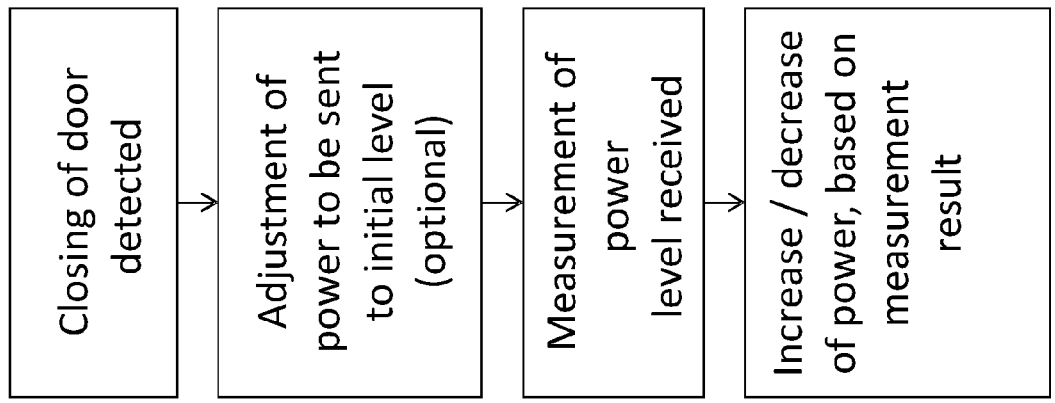
FIG. 5 presents a functional diagram of the operation of one embodiment according to the invention.

FIG. 5 presents the operation of a lock arrangement according to one embodiment of the invention in a situation in which the door closes and the lock arrangement detects the closing of the door. When the arrangement detects that the door has closed, the counterpart of the lock starts to wirelessly send electrical power to the lock case and/or into connection with the lock case e.g. with the means that are for sending electrical power. The lock case wirelessly receives electrical power sent from the counterpart of the lock with the means that are for receiving electrical power, when the lock and the counterpart of the lock are at a certain distance from each other. In one embodiment of the invention the sending of power can always be started from a certain initial power level or, alternatively, from the power level used earlier. A certain power level can be set to be suitable for each lock & striking plate pair in conjunction with installation of the lock, or the initial level can be the same for all the locks and it can be set e.g. already at the factory.

In the solution of the invention the electrical power received from the connection of the lock, e.g. from the means for receiving electrical power, is further measured, so that it is known how much electrical power has been received by the lock. Losses occurring during the sending, such as e.g. the distance of the lock and the counterpart of the lock from each other and how well aligned the lock and the counterpart of the lock are, affect the power level received. The power level of the electrical power sent is decreased and/or increased in such a way that the measured level of the electrical power received is between certain predetermined upper and lower values or essentially at a given preset level. In this way enough power from the viewpoint of reliable functioning of the lock is always sent to the lock, but at the same time the transfer of excess power is avoided. In the solution of the invention the lock can communicate the level of electrical power received to the counterpart of the lock, so that the power level can be decreased, increased and/or kept unchanged. The lock can e.g. communicate to the counterpart of the lock the measured electrical power level, voltage and/or current. The lock can e.g. communicate to the counterpart of the lock whether the power level received is too low, too high and/or essentially the magnitude of a certain predetermined level or between certain upper and lower values. That being the case, the counterpart of the lock can adjust the electrical power sent to be suitable on the basis of the information received from the lock. Changing the power level that is sent can be performed in steps or otherwise the lock can try to determine the power level needed on the basis of one measurement result. When the power level received has reached a determined target level, the adjustment of the power level can be ended until the door is opened and the electricity supply is disconnected, or until information is received from the lock that the power level received is no longer within the defined range.

In the following the operation of the solution according to the invention in a situation in which the electricity supply to the lock is in progress is presented. In this case when it is desired to open the lock, the access control system or some other access control device sends a command to the counterpart of the lock of the door about opening the door lock after the power supply has started. Before sending a command over a wireless interface, the command is encrypted. The command can be encrypted in the counterpart of the lock or already previously, e.g. in the access control system. After encryption, the counterpart of the door sends a message to the door lock, utilizing the components to be used in the transfer of electrical power. When the door lock receives the message, the encryption is decrypted and the content of the message interpreted. After this, the lock executes the command, in other words e.g. opens the lock, locks the lock, or sends the status information of the lock to the counterpart of the lock.

If the lock wants to send a message to the counterpart of the lock, the system functions in such a way that the lock of the door encrypts the message (e.g. its status information) and sends it utilizing the components used for receiving electrical power. Correspondingly, the counterpart of the lock receives the message and sends it onwards. When the encryption of the message is decrypted, the content of the message can be read. The encryption of a message can be decrypted e.g. in the counterpart of the lock or not until the final receiving destination e.g. in the access control system.

For practical reasons, e.g. in a situation in which a damaged lock is replaced with a new lock, the identifier and encryption key of the new lock to be installed can be set in connection with the installation. For permitting the changing of the identifier, the authentication method described above can be used between the lock and/or the counterpart of the lock and the replacement tool.

The lock arrangement according to the invention can function at the start of the lock and the counterpart of the lock forming contact e.g. in the manner described in the following. When the door is open, there is no data link between the lock and the counterpart of the lock. The counterpart of the lock occasionally switches power to the lock so that the electronics of the lock would wake up when the door is closed fully and the transfer of power succeeds. When closing the door fully, the distance of the counterpart of the lock and the lock from each other is such that the transfer of power can be started. In this case the electronics of the lock activates as a consequence of the connection of power and the software of the lock starts up and begins to receive electrical power. The power to be sent can be adjusted e.g. in this phase to a predefined level or to within predefined limits.

When the connection transferring electrical power has been formed, the lock and the counterpart of the lock can create a data link between the lock and the counterpart of the lock. For creating the data link, the lock and the counterpart of the lock authenticate each other. After authentication the counterpart of the lock sends an encrypted control command and the command is sent via the means of the counterpart of the lock that are for sending electrical power, over the wireless interface, to the lock via the devices of the lock that are for receiving electrical power. After this the lock decrypts and interprets the control command and executes the control command. In one embodiment of the invention the level of power to be sent is adjusted only after authentication.

The lock can send e.g. its status information in encrypted format to the counterpart of the lock. In this case the counterpart of the lock receives, by the aid of the means sending electrical power, the status information sent by the lock, which status information the lock sends by the aid of the means receiving electrical power. After receiving, the counterpart of the door decrypts and interprets the status information. The counterpart of the lock can transmit the status information onwards, e.g. to the access control. Information can also be sent in encrypted format to the access control or in encrypted format to some other corresponding system or unit, where the encryption is then decrypted.

When the door is opened, the transfer of electrical power and data link between the lock and the counterpart of the lock are disconnected. When the door is closed again, the aforementioned procedures are performed again from the beginning. After closing of the door, the status of the lock can be set to a status corresponding to the opening of the door or to a new control command received.

The lock can be without current when the door is open because in this case there is no need to control it. The lock functions in this case as a mechanical lock. By means of the solution of the invention it can be deduced that the door is open when the transfer of power and/or the transfer of information cannot be performed and that it is closed when power transfer and/or information transfer is possible and/or in progress. In addition to this, in one embodiment of the invention the closed state and locked state of the door can be determined even more precisely when the lock and the counterpart of the lock are close to each other even though the door is not fully closed or locked. This situation can be detected by means of the power transfer, e.g. by comparing the power sent and the power received, such that power reception is possible but the power level received is low. This kind of situation is when the door is still slightly ajar and the lock and the counterpart of the lock are not fully face to face. In one embodiment of the invention when it is detected that the door is almost, but not quite, closed, i.e. when the lock and the counterpart of the lock are close but not exactly face to face, the door can be tightened closed by means of the lock or other means, e.g. by controlling the latch tightening the lock to tighten the door closed. In one embodiment of the invention the lock and/or the counterpart of the lock can have a separate identification for the purpose of locking the lock.

In one embodiment of the invention information can be collected about the development of the power level received by the lock and if changes occur in the power received and/or in the ratio of power received with respect to the power level of the power sent, it can be deduced that the door, in which the lock arrangement is installed, is damaged or worn, or that there is some other defect in the door that prevents it from closing properly.

In one embodiment of the invention, the lock can have a battery, which keeps the electrical components of the lock on when the power transfer is disconnected.

By means of the solution according to the invention it is also possible to wirelessly transfer information between the lock and the counterpart of the lock. The information transfer is digital and authentication methods and/or encryption methods are used in the lock application to ensure data security.

By means of encryption and authentication it is ensured that the lock reacts only to commands transmitted by an identified (acting as the correct pair) counterpart. An unauthorized device that does not know the encryption key used cannot create or send to the lock a control message in an acceptable format and therefore cannot mislead the lock into the incorrect operating mode. The counterpart of the lock accepts and transmits onwards only the status information it receives from an identified lock (acting as the correct pair). An unauthorized device that does not know the encryption key used cannot send status information in an acceptable format and therefore cannot mislead the access control system. The encryption key used is not sent at any stage to another device. The encryption key used is kept in the device in such a way that it would not be economically reasonable to uncover it.

The aim of authentication is therefore to ensure that the devices communicating with each other recognize one another. In this way, a fraudulent device cannot control another device. Likewise, transmission of information to a fraudulent device is also prevented. Authentication can be performed before permitting use of the service.

Authentication can be one-way (server identifies user) or two-way (service identifies user, and the user identifies the service).

In the solution according to the invention the lock ensures, by means of authentication, before executing a command, that the control command comes from an identified device (from the identified counterpart of the lock). By checking the identity of the counterpart of the lock, the lock ensures that the device of an unauthorized person (intruder) cannot control the operation of the lock.

The counterpart of the lock ensures, by means of authentication, before transmission to the building automation of the status information received from a lock, that the status information originates from an identified device (from an identified lock). In this way the counterpart of the lock ensures that incorrect status information delivered by the device of an unauthorized person (intruder) does not travel onwards and jeopardize the safety of the locking.

After successful authentication, information, which is encrypted, can be transferred between the lock and the counterpart of the lock. Various encryption technologies used in telecommunications or in computers can be used as encryption methods for encrypting the messages of the information transfer. Encryption means the converting of the plain text information to be encrypted into a type of format that makes clarification of the original information either impossible or too expensive (i.e. breaking the encryption takes too much time or resources compared to the value of the encrypted information).

The handling of encrypted information is generally two-directional: the information to be encrypted can be converted into an unreadable format for encrypting the information and, correspondingly, the encrypted information can be returned back to the original format for utilizing it. Examples of algorithms to be used for the encryption of the information are, inter alia, DES, AES and Blowfish.

In the solution according to one embodiment of the invention the data transfer speed between the lock and the counterpart of the lock is approx. 1 kBit/s. This transfer speed is sufficient for the solution according to the invention, because the amount of information to be transferred between the counterpart of the lock and the lock is small despite the authentication and encryption protocols.

In one embodiment of the invention, the means for sending 303 electrical power are separate and the means that can be installed in connection with the counterpart 101, 301 of the lock and/or the means for receiving 205 electrical power are separate and the means that can be installed in connection with the lock 102, 202.

In one embodiment of the invention, the means for receiving 205 electrical power are arranged in the lock case 203 and/or the means for sending 303 electrical power are arranged in the counterpart 101, 301 of the lock.

In one embodiment of the invention, the lock 102, 202 and the counterpart 101, 301 of the lock comprise means for encrypting and decrypting the information to be transmitted.

It is obvious to the person skilled in the art that the different embodiments of the invention are not limited solely to the examples described above, and that they may therefore be varied within the scope of the claims presented below. The characteristic features possibly presented in the description in conjunction with other characteristic features can also, if necessary, be used separately to each other.

The invention claimed is:

1. A method for transferring electrical power with a lock arrangement that comprises a counterpart of the lock and an electrical lock comprising a lock case, wherein means for wirelessly sending electrical power to the lock case and/or into connection with the lock case are arranged in connection with the counterpart of the lock and arranged in the lock case and/or in connection with the lock case are means for wirelessly receiving electrical power from the means for sending electrical power that are arranged in connection with the counterpart of the lock, and wherein the counterpart of the lock wirelessly sends electrical power to the lock case and/or into connection with the lock case with the means that are for sending electrical power, and the lock case wirelessly receives electrical power from the counterpart of the lock with the means that are for receiving electrical power, when the lock and the counterpart of the lock are at a certain distance from each other, in which method the electrical power received from the connection of the lock is measured and the power level of the electrical power sent is decreased and/or increased in such a way that the measured level of the electrical power received is between certain predetermined upper and lower values or essentially at a given preset level, wherein electrical power is sent from the counterpart of the lock to the lock only when the door is closed.

2. The method according to claim 1, wherein the counterpart of the lock scans for the presence of the lock at regular intervals.

3. The method according to claim 1, wherein the means for sending and for receiving electrical power are coils, e.g. planar coils.

4. The method according to claim 1, wherein electrical power is transmitted via an inductive coupling.

5. The method according to claim 1, wherein the lock sends to the counterpart of the lock information about the level of measured electrical power.

6. The method according to claim 5, wherein the information about the level of measured electrical power is a measured value of the electrical power level, such as e.g. power level, voltage or current, or information about whether the measured level of electrical power is too low, too high, at essentially a predetermined level and/or between predetermined limit values.

7. The method according to claim 1, wherein in the method the door is tightened closed by means of the lock or other means, before adjustment of the power or after it, e.g. by controlling the latch tightening the lock to tighten the door closed when the level of the measured electrical power is smaller than a predetermined value.

8. A lock, which comprises a lock case, which lock case comprises electrical means for opening and/or closing the locking latch, wherein arranged in connection with the lock case are means for wirelessly receiving electrical power from the means for sending electrical power that are arranged in connection with the counterpart of the lock, wherein electrical power is adapted to be received from the means of the counterpart of the lock that are for sending electrical power to the means of the lock case that are for receiving electrical power, when the lock case and the counterpart of the lock are at a certain distance from each other, wherein the lock is adapted to measure the electrical power received and to send information about the measurement result of received electrical power, and wherein electrical power is sent from the counterpart of the lock to the lock only when the door is closed.

9. A counterpart of a lock, wherein means for wirelessly sending electrical power to the lock case and/or into connection with the lock case are arranged in the counterpart of the lock and wherein electrical power is adapted to be sent from the means of the counterpart of the lock that are for sending electrical power to the means of the lock case that are for receiving electrical power when the lock case and the counterpart of the lock are at a certain distance from each other, and wherein the counterpart of the lock is arranged to receive from the lock information about the measurement result of received electrical power, wherein the counterpart of the lock is further arranged to decrease and/or increase the power level of the electrical power sent on the basis of the measurement result received in such a way that the measured level of the electrical power received is between certain determined upper and lower values or essentially at a given preset level, wherein electrical power is sent from the counterpart of the lock to the lock only when the door is closed.

10. A lock arrangement, which comprises a counterpart of the lock and an electrical lock comprising a lock case, and wherein means for wirelessly sending electrical power to the lock case and/or into connection with the lock case are arranged in connection with the counterpart of the lock and arranged in the lock case and/or in connection with the lock case are means for wirelessly receiving electrical power from the means for sending electrical power that are arranged in connection with the counterpart of the lock, and wherein the counterpart of the lock is adapted to wirelessly send electrical power to the lock case and/or into connection with the lock case with the means that are for sending electrical power, and the lock case is adapted to wirelessly receive electrical power from the counterpart of the lock with the means that are for receiving electrical power when the lock and the counterpart of the lock are at a certain distance from each other, wherein the lock is adapted to measure the electrical power received, wherein the counterpart of the lock is adapted to decrease and/or increase the power level of the electrical power sent in such a way that the measured level of the electrical power received is between certain determined upper and lower values or essentially at a given preset level, and wherein electrical power is sent from the counterpart of the lock to the lock only when the door is closed.

11. The arrangement according to claim 10, wherein the counterpart of the lock is adapted to scan for the presence of the lock at regular intervals.

12. The lock arrangement according to claim 10, wherein the means for sending and for receiving electrical power are coils, e.g. planar coils.

13. The lock arrangement according to claim 10, wherein electrical power is adapted to be transmitted via an inductive coupling.

14. The lock arrangement according to claim 10, wherein the lock is adapted to send to the counterpart of the lock information about the level of measured electrical power.

15. The lock arrangement according to claim 14, wherein the information about the level of measured electrical power is a measured value of the electrical power level, such as e.g. power level, voltage or current, or information about whether the measured level of electrical power is too low, too high, at essentially a predetermined level and/or between predetermined limit values.

16. The lock arrangement according to claim 10, wherein the lock arrangement is adapted to tighten the door closed by means of the lock or other means, before adjustment of the power or after it, e.g. by controlling the latch tightening the lock to tighten the door closed, when the level of measured electrical power is smaller than a predetermined value.

* * * * *